US008932782B2

(12) United States Patent
Sahu et al.

(10) Patent No.: US 8,932,782 B2
(45) Date of Patent: Jan. 13, 2015

(54) PROCESS FOR THE PREPARATION OF SOL-GEL MODIFIED ALTERNATIVE NAFION-SILICA COMPOSITE MEMBRANE USEFUL FOR POLYMER ELECTROLYTE FUEL CELL

(75) Inventors: Akhila Kumar Sahu, Ganjam (IN); Ganesh Selvarani, Salem (IN); Sethuraman Pitchumani, Chennai (IN); Parthasarathi Sridhar, Chennai (IN); Ashok Kumar Shukla, Bangalore (IN)

(73) Assignee: Council of Scientific and Industrial Research, New Delhi (IN)

( * ) Notice: Subject to any disclaimer, the term of this patent is extended or adjusted under 35 U.S.C. 154(b) by 2170 days.

(21) Appl. No.: 11/940,203

(22) Filed: Nov. 14, 2007

(65) Prior Publication Data

US 2012/0141915 A1   Jun. 7, 2012

(51) Int. Cl.
 *H01M 8/10* (2006.01)
 *C08J 5/22* (2006.01)
(52) U.S. Cl.
 CPC ............. *C08J 5/22* (2013.01); *H01M 8/1023* (2013.01); *H01M 8/1039* (2013.01); *H01M 8/1046* (2013.01); *H01M 8/1081* (2013.01); *H01M 8/109* (2013.01); *H01M 2008/1095* (2013.01); *Y02E 60/522* (2013.01); *C08J 2327/18* (2013.01); *C08J 2383/02* (2013.01)
 USPC ............ 429/494; 429/491; 429/492; 429/493
(58) Field of Classification Search
 None
 See application file for complete search history.

(56) References Cited

U.S. PATENT DOCUMENTS

| 5,523,181 | A | 6/1996 | Stonehart et al. ............. 429/314 |
| 5,766,787 | A * | 6/1998 | Watanabe et al. ............ 429/494 |
| 5,919,583 | A | 7/1999 | Grot et al. ....................... 429/33 |
| 8,142,953 | B2 * | 3/2012 | Kim et al. ..................... 429/495 |
| 2004/0197638 | A1 * | 10/2004 | McElrath et al. ............... 429/44 |
| 2007/0154764 | A1 * | 7/2007 | MacKinnon et al. ........... 429/33 |

FOREIGN PATENT DOCUMENTS

WO  WO 2007069867 A1 *  6/2007

OTHER PUBLICATIONS

Miyake et al., Evaluation of a Sol-Gel Derived Nafion/Silica Hybrid Membrane for Proton Electrolyte Membrane Fuel Cell Applications, Jul. 5, 2001, Journal of The Electrochemical Society, 148 (8) A898-A904.*

* cited by examiner

*Primary Examiner* — Barbara Gilliam
*Assistant Examiner* — Adam A Arciero
(74) *Attorney, Agent, or Firm* — Fulbright & Jaworski LLP

(57) ABSTRACT

The present invention provides a process for the preparation of sol-gel modified alternative Nafion-Silica composite membrane useful for polymer electrolyte fuel cell. The said composite membrane is made by embedding silica particles in perfluorosulfonic acid ionomer by a process that circumvents the use of added acid while using acidic characteristics of Nafion and polymerization reaction through a sol-gel route. The composite membrane has high affinity for water with capability to exchange protons. The approach may be used to manufacture polymer electrolyte membrane fuel cells operating at elevated temperatures under near-zero humidity.

15 Claims, 3 Drawing Sheets

PROCESS FOR THE PREPARATION OF SOL-GEL MODIFIED ALTERNATIVE NAFION-SILICA COMPOSITE MEMBRANE USEFUL FOR POLYMER ELECTROLYTE FUEL CELL

BACKGROUND OF THE INVENTION

1. Field of the invention

The present invention relates to a process for the preparation of sol-gel modified alternative Nafion-Silica composite membrane useful for polymer electrolyte fuel cell. More particularly, the present invention relates to a process for the preparation of sol-gel modified alternative Nafion-Silica composite membrane useful for polymer electrolyte fuel cell at both elevated temperatures and low relative-humidity.

2. Description of Related Art

A fuel cell is an electrochemical power source with advantages of both the combustion engine and battery. Like a combustion engine, a fuel cell will run as long as it is provided fuel; and like a battery, fuel cell converts chemical energy directly to electrical energy. The components of a solid polymer electrolyte fuel cell include an anode, a cathode and a solid polymer membrane electrolyte sandwiched between the anode and the cathode. Accordingly, the polymer electrolyte also serves as a physical separator between anode and cathode. A polymer electrolyte membrane fuel cell operates with gaseous hydrogen as fuel and oxygen from the air as the oxidant. In the fuel cell, the ionically conducting membrane should provide high ionic-conductance with high strength, and chemical/electrochemical/thermal stability under operating conditions. In conventional polymer electrolyte membrane fuel cells, the polymer electrolyte membrane is made of one or more fluorinated polymers, for example NAFION®, a perfluorosulfonic acid polymer.

In the fuel cell, $H^+$-ions (protons) formed at the anode migrate through the membrane to the cathode and combine with oxygen to form water. In the fuel cell, the anode and/or cathode are provided by forming a layer of electrically conducting, catalytically active particles, usually including a polymeric binder, onto the proton conducting membrane, and the resulting structure is referred to as the membrane electrode assembly (MEA). Membranes made from perfluorinated sulfonic acid polymer (NAFION®) have been found to be particularly useful for MEAs and electrochemical cells due to its good conductivity, and good chemical and thermal resistance that provide long service-life.

For application in fuel cells, it is desirable to have polymer electrolyte membrane with high proton conductivity at low relative-humidity, long-life with long-term chemical/electrochemical/thermal stability and low gas-permeability. The Nafion polymer membrane takes the shape of a transparent film and has an equivalent weight of about 1100, and when fully hydrated, it exhibits protonic conductivity of $10^{-2}$ S/cm at 25° C. However, the ionic conductivity of the Nafion® polymer membrane is sensitive to both temperature and relative humidity. In addition, when the Nafion® polymer membrane is used at relatively elevated temperatures, it is thermally deformed. Thus, the performance of the fuel cell reduces during its operation. Similarly, when fuel cells operate at low relative-humidity, the proton conductivity of the membrane drastically reduces, which limits operation of the fuel cell. Thus, an increase in proton conductivity of the membrane is desired for fuel cells operating at temperatures ranging between 60° C. and 150° C. at low humidification.

Various proton conducting membranes known in the related art are classified as follows.

Organic Polymer Membranes:

Organic polymer membranes at present dominate polymer electrolyte membrane fuel cell development. At low operating-temperatures, NAFION® (Du Pont), GORE-SELECT reinforced membranes (W. L. Gore), ACIPLEX® (Asahi Chemicals), FLEMION® (Asahi Glass), and BAM® (Ballard Power) are used. These membranes besides being expensive are limited to cell operation temperatures not exceeding 90° C. even with well humidified gas feeds. By contrast, high-temperature membranes focus on the use of sulfonated/phosphonated polymers, such as $H_3PO_4$-doped polybenzimidazole (PBI) or polyoxadiazoles. These membranes are also expensive and their stability is limited.

Inorganic Membranes:

Inorganic membranes known to be used in polymer electrolyte membrane fuel cells are heteropolyacids, such as phosphotungstic acid ($H_3PO_4.12WO_3.xH_2O$), phosphomolybdic acid ($H_3PO_4.12MoO_3.xH_2O$), and silicotungstic acid ($SiO_2.12WO_3.xH_2O$) and sol-gels, such as silica, titania, alumina, zirconia and zeolite. However, inorganic membranes are brittle and exhibit poor ionic conductivity.

Composite Membranes:

Composite membranes include inorganic-organic and organic-organic membranes. The inorganic-organic membranes contain organic binders with inorganic acids, such as Zr-Phosphate+PTFE and silicophosphate-gel glass composite, sol-gel silane+PEO+$HClO_4$, silicophosphate-gel composite+porous alumina support+$HClO_4$, etc. Organic-organic polymer membranes contain two or more organic polymers, such as PPSU (Polyphenyl sulfone)+PBO (Polybisbenzoxazole-1,4-phenylene), etc.

The development of a proton-conducting membrane with improved water retention or a reduced dependence on free moisture for proton conduction will facilitate the operation of proton conducting membrane fuel cells without any external humidification at elevated temperatures. This would enable simpler, cost-effective and lighter fuel cell stacks. An alternative to polymeric proton-conductors is oxide proton-conductors. A wide variety of metal oxides are proton conductors, generally, in their hydrated or hydrous forms. These oxides include hydrated precious metal containing oxides, such as $Ru_2O_3$, acid oxides of the heavy post-transition elements, such as acidic antimony oxides, and tin oxides, and the oxides of the heavy transition-metals, such as Mo, W, and Zr. Many of these materials are also useful as mixed oxides. Certain oxides that do not fit this description, such as silica ($SiO_2$) and alumina ($Al_2O_3$) are also used with or without modifiers due to their water retention characteristics. Alpha-zirconium phosphate is an excellent proton conductor at ambient temperatures. Under these conditions, the compound is hydrated $Zr(HPO_4)_2$, and most of the conductivity is due to the proton migrating over the surface of the individual crystallites. Above 120° C., water of hydration is lost and the conductivity drops substantially to a value representing the bulk conductivity of the solid. With these properties, alpha-zirconium phosphate is suitable only for low-temperature (<100° C.) fuel cells.

U.S. Pat. No. 5,523,181, due to Stonehart et al., describes the use of a composite membrane, comprising high surface-area silica fibers as filler with a variety of polymers capable of exchanging cations with solutions, as the electrolyte matrix for use in polymer electrolyte fuel cells. These membranes are produced by suspending the inorganic phase in a solvent appropriate for dissolution of the polymer and blending the suspension with a solution of the polymer in the same solvent. Composite membranes are formed by evaporating the solvent in a controlled manner to produce a thin film. Silica is selected owing to its affinity towards water and ability to retain it. Stonehart et al. report reduced electrical resistance in their fuel cells operating under low humidification. The improved performance of the fuel cell is attributed to water retention by silica, and back diffusion of water, from the cathode to the anode along the silica fibers, replacing the water removed by electroosmotic drag. U.S. Pat. No. 5,919,583, due to Grot et al., describes the addition of solids, such as zeolites or tin-mordenite, to improve the performance of the composite membranes. But, their presence in the membranes does not impart high enough proton conductivity to make them useful as solid electrolytes in polymer electrolyte membrane fuel cells.

In view of the aforesaid description, there is need to improve the proton conductivity and water retention capability of polymeric membranes at elevated temperatures along with their operational compatibility in fuel cells at low humidity. In the present invention, a process for embedding silica particles in its solution form into the Nafion® ionomer is described.

SUMMARY OF THE INVENTION

The main objective of the present invention is to provide a process for the preparation of polymer electrolyte membrane useful for polymer electrolyte fuel cell.

Another objective of the present invention is to provide a process for the preparation of polymer electrolyte membrane, which exhibits high proton conductivity at elevated temperatures and low-humidity ambience.

Yet another objective is to provide a silica sol by a controlled sol-gel route with simple water hydrolysis and polycondensation reaction without using any acid or base catalyst.

Yet another objective is to provide a controlled, homogeneous and transparent silica sol.

Yet another objective is to provide a membrane electrolyte fuel cell with hydrogen as fuel.

Yet another objective is to provide a membrane electrolyte fuel cell with hydrogen as fuel, which exhibits good performance at elevated temperatures and under low relative-humidity conditions.

Accordingly the present invention provides a process for the preparation of sol-gel modified alternative Nafion-Silica composite membrane useful for polymer electrolyte fuel cell and the said process comprising of:
  (a) preparing silica sol using water hydrolysis and poly condensation reaction by mixing silicon alkoxide, isopropyl alcohol and water, under stirring, in a molar ratio of 1-1.2:3.9-4.1:3.9-4.1 respectively, followed by sonication for 10-15 minutes to obtain the visibly homogenous and transparent colloidal suspension,
  (b) impregnating the required amount of above said sol within the polymer matrix of perfluorosulphonic acid (Nafion) to obtain the resultant admixture, followed by sonication for another 15-20 minutes and transfer it to a flat dish, followed by drying under vacuum, at a temperature in the range of 85°-95° C. and detaching the desired Nafion-Silica composite membrane by known methods.

In an embodiment of the present invention the silicon alkoxide used in step (a) is tetraethyl ortho silicate.

In yet another embodiment, the molar ratio of tetra ethyl ortho silicate to isopropyl alcohol and water used in step (a) is preferably 1:4:4.

In yet another embodiment, the Nafion-Silica membrane obtained is a homogenous and visibly transparent in nature.

In yet another embodiment, the silica content in the Nafion-Silica composite membrane obtained is in the range of 2.5-15 wt % of perfluorosulfonic acid (Nafion).

In yet another embodiment, the silica content in the Nafion-Silica composite membrane obtained is preferably 10 wt % of perfluorosulfonic acid (Nafion).

In yet another embodiment the Nafion-Silica composite membrane is useful for polymer electrolyte fuel cells.

In yet another embodiment the Nafion-Silica composite membrane obtained exhibits proton conductivity at a temperature of 150°-155° C. and at all values of relative humidity.

In yet another embodiment, the Nafion-Silica composite membrane obtained exhibits proton conductivity of $5.28 \times 10^{-3}$ S/cm at 150° C. and at near-zero humidity.

In yet another embodiment, the Nafion-Silica composite membrane obtained is useful for polymer electrolyte fuel cell, at a temperature in the range of 60-150° C. and at atmospheric pressure.

In yet another embodiment, the Nafion-Silica composite membrane obtained is useful for polymer electrolyte fuel cell at a relative humidity of 0-100% at atmospheric pressure.

The present invention further provides a polymer electrolyte fuel cell comprising Nafion-Silica composite membrane sandwiched between platinum catalyst loaded known cathode and anode wherein the said composite membrane is prepared by sol-gel condensation method without using any external acid or base and is homogenous and visibly transparent without any particle or phase aggregation having a thickness of 80-85 μm.

In yet another embodiment, the silica content in the polymer composite membrane used is preferably 10 wt % of perfluorosulphonic acid (Nafion).

In yet another embodiment, the fuel used is a direct feed of hydrogen gas.

In yet another embodiment, the cathode and anode is made of carbon material.

In yet another embodiment, the polymer electrolyte fuel cell exhibits a maximum power density of 720 mW/cm$^2$ at a temperature of 60° C. and at a relative humidity of 100% at atmospheric pressure.

In still another embodiment, the polymer electrolyte fuel cell exhibits a maximum power density of 340 mW/cm$^2$ at a temperature of 100° C. at atmospheric pressure.

The invention provides an improved alternative cation exchange membrane for use in fuel cells operating at elevated temperatures without any external humidification. A cation exchange membrane in accordance with the invention is made from polymer having cation exchange groups with inorganic filler dispersed therein. Preferably, the inorganic filler is a water absorbing material. Most preferably, the inorganic filler is selected from the group consisting of silicon dioxide, silicon hydroxide and mixtures thereof. It is also preferred for the inorganic water absorbing materials to be 2.5 wt % to 15 wt % of perfluorosulfonic acid.

Conventionally, the water absorbing inorganic oxide materials are embedded into the pores of a porous polymer matrix by several processes. One such method includes impregnating the inorganic oxide particles as fine powders, either commercially available or synthesized chemically, into the pores of a porous polymer matrix. Another method includes addition of direct precursor generally as metal alkoxides to the pores of a porous polymer matrix, and then converting the precursor material into the desired proton conducting oxide. Another method includes precipitating a mixture of the ion-conducting oxide and a polymer matrix from solution and pressing the precipitate as a membrane. In most of the cases, the solid polymer electrolyte, such as Nafion®, is dipped in the inorganic metal alkoxide precursor till the desired percentage of the impregnation of inorganic fillers is achieved in the pores of Nafion®. Filling of the inorganic materials into the polymeric matrix by the above process may not result in homogeneous membranes, as some portions of the matrix may contain more oxide than other portions of the matrix. In non-homogeneous filling processes, it is possible that some portions of the matrix may contain a little oxide or no oxide at all. It is also possible to find the higher concentration of the filler particles on the bottom part of the membrane due to the sedimentation effect of the heavier ceramic/inorganic particles. As a result, the solid fillers in composite membranes do not contribute sufficiently to proton conductivity of the membrane under dry conditions.

The present invention is directed towards obviating the aforesaid disadvantages. An in-situ sol-gel process is attempted wherein a homogeneous and transparent inorganic sol is first prepared by a controlled hydrolysis and polymerization route in absence of any acidic or basic environment. Subsequently, a required amount of the sol is embedded into the polymeric matrix leading to a film of desired thickness. As a result, a transparent polymer film is obtained without any particle/phase separation. The transparent nature of the film is also maintained from the membrane surface to the bulk and throughout the entire surface of the polymeric matrix.

The invention facilitates a fuel cell with a direct-feed hydrogen fuel, which includes an anode compartment containing an anode, a cathode compartment containing a cathode, and a membrane serving as a separator and electrolyte between the anode and cathode compartments. The membrane comprises a polymer having cation exchange groups with inorganic filler dispersed therein.

Preferred membranes, in accordance with the present invention, having inorganic filler as water absorbent, have enhanced proton conductivity. Fuel cells made with membranes of this invention have enhanced electrical performance, particularly at elevated temperatures under low relative-humidity.

The invention also provides a process for making cation exchange membranes containing dispersed inorganic filler. A process in accordance with the invention comprises forming a membrane of polymer having cation exchange groups and dispersing inorganic filler in the membrane by an in-situ sol-gel process. Preferred forms of the process, in accordance with the invention, are also useful for dispersing the inorganic proton conductors, such as titanium dioxide, zirconium oxide and zirconium hydrogen phosphate, in the membrane.

The invention further provides composite electrolyte membranes for fuel cells, which perform efficiently at 150° C. under near-zero humidity conditions. The conductivity of the composite membrane of the present invention at 150° C. and at near-zero humidity is $5.28 \times 10^{-3}$ S/cm as comparable to Nafion® that exhibits proton conductivity value of $4.38 \times 10^{-5}$ S/cm in open ambience at 150° C. The fuel cell using composite membrane of the present invention, while operating at 60° C. with 18% humidity, exhibits maximum power density of 300 mW/cm² at atmospheric pressure. By contrast, the fuel cell with Nafion®-1135 electrolyte membrane exhibits a maximum power density of only 30 mW/cm² under similar operational conditions.

The skilled artisan should also comprehend that the present invention should not be limited to silica fillers and Nafion® polymer matrix. Indeed, other inorganic fillers, like titania and zirconia, can also be used in accordance with the present invention. Similarly, besides Nafion® polymer, this process could also be extended for polysulfones, polystyrenes, polyether imides, polyphenylenes, poly alpha olefins, polycarbonates, polyther ether ketone and mixtures thereof.

The present invention provides water absorbing particles embedded in the membrane that absorb water under wet conditions and provide a water reservoir to keep the membrane irrigated under dry conditions. Thus, the water absorbing particles allow the fuel cell to survive periods of "inletstream draught" without excessive loss in membrane conductivity. With the present invention, humidification requirements of a fuel cell stack in an operating system will be reduced. This will result in reduction or elimination of humidification equipment and the reduction or elimination of condensing requirements downstream of the stack. Accordingly, system complexity and cost are also substantially reduced. With the use of composite membrane of the present invention, fuel cell stack response to periods of low-inletstream humidity will be greatly improved and membrane durability will be increased.

BRIEF DESCRIPTION OF THE DRAWINGS

The present invention will be described with reference to the accompanying drawings, wherein.

DETAILED DESCRIPTION OF THE INVENTION

Figure 1:
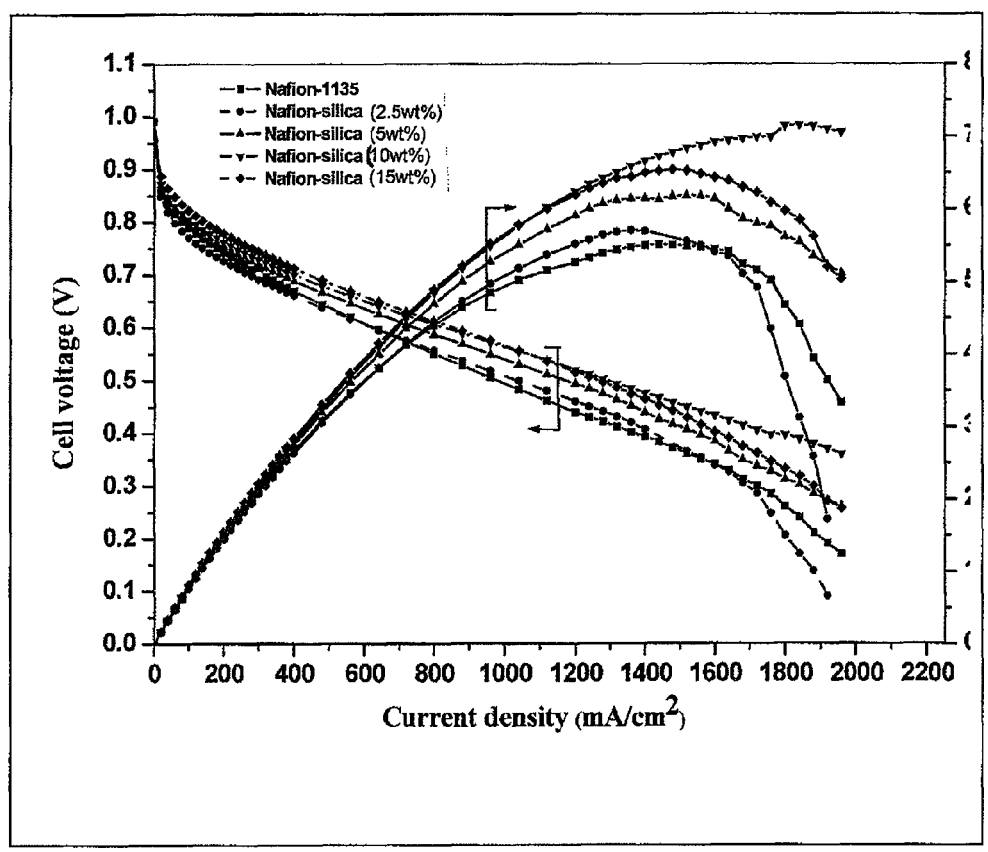
FIG. 1 shows performance curves for Nafion-1135 and Nafion-Silica composite membrane in fuel cell at 100% relative humidity at ambient atmospheric pressure according to an aspect of the present invention.

A PEM (proton exchange membrane, also called polymer electrolyte membrane) fuel cell uses a simple chemical process to combine hydrogen and oxygen into water while producing electric current. At the anode, the hydrogen molecules yield electrons and form hydrogen ions, a process which is made possible by a catalyst. The electrons travel to the cathode through an external circuit producing electrical current. This current can perform useful work by powering an electrical device. The proton exchange membrane allows protons to flow through, but prevents electrons from passing through it. As a result, while the electrons flow through an external circuit, the hydrogen ions flow directly through the proton exchange membrane to the cathode, where they combine with oxygen molecules and the electrons to form water. Thus, the natural tendency of hydrogen fuel to oxidize and form water is utilized to produce electricity, which is then used to do work. No pollution is produced, and the only resulting products are water and heat.

In accordance with one embodiment, the present invention provides method for producing a polymer electrolyte membrane for a fuel cell. A membrane is made of a polymer having cation exchange groups, which can transport protons across the membrane. The cation exchange groups are preferably selected from the group consisting of sulfonic acid groups. In a preferred form of the invention, the polymer comprises a polymer backbone and recurring side chains attached to the backbone with the side chains carrying the cation exchange groups.

The equivalent weight of the cation exchange polymer can be varied as desired for the particular application. Membrane equivalent weight is defined as the weight of the polymer in sulfonic acid form required to neutralize one equivalent of NaOH. In the case where the polymer comprises a perfluorocarbon backbone and the side chain is the salt of —O—$CF_2$—CF($CF_3$)—O—$CF_2$—$CF_2$—$SO_3$X, the equivalent weight is preferably between 800-1500, and most preferably between 900-1200.

In order to meet the aforesaid requirements for a cost-effective polymer electrolyte membrane fuel cell, the polymer electrolyte membrane requires a stable polymer as a backbone, e.g. Nafion® uses a Teflon backbone structure. The present invention identifies water absorbing materials suitable for use as a backbone that are naturally available and environmental friendly. Dispersing the water absorbing material in the solution form via a sol-gel route into the polymer matrix produces a composite membrane. Varying weights of the water absorbing material in the polymer matrix produce different composite membranes, which are suitable for operation both at low (~60° C.) and elevated temperatures (~150° C.) under a wide range of relative humidity (100% to near-zero relative humidity). On a laboratory scale, the water-absorbing materials, such as silica, in the form of metal alkoxide are low cost-materials.

The thickness of the membrane can be varied as desired for a particular electrochemical cell application. Typically, the thickness of the membrane ranges between 60 and 100 micron.

While the membranes in accordance with the invention may contain a porous support and may contain inorganic filler as will be discussed in more detail hereinafter, it is preferred for the cation exchange polymer to be present as a continuous phase within the membrane.

Inorganic Fillers:

A wide variety of inorganic fillers may be dispersed in the membranes in accordance with the present invention. The inorganic filler may be essentially non-conductive, such as type-A zeolites of cesium, potassium, or mixtures thereof. Zeolites are well-defined class of naturally occurring alumino silicate minerals. They are described, e.g. by Alan Dyer in "An Introduction to Zeolite Molecular Sieves," John Wiley & Sons, Chichester, N.Y., 1988.

Preferably, the inorganic filler are inorganic oxide particles that have the capability to retain water even at elevated temperatures and under low relative-humidity conditions and thus increase the conductivity of the membrane. Preferred water absorbing inorganic particles are selected from the group consisting of Sn, Sb, Mo, W, Ti and Zr, most preferably, oxides and phosphates of these metals. Especially, preferred water absorbing inorganic particles are titanium dioxide, silicon dioxide, tin and hydrogen mordenite, oxides and phosphates of zirconium and mixtures thereof. In the present invention, an improved process of embedding silicon dioxide water absorbing material to the polymer matrix is explained.

The amount of inorganic water absorbing material used in ion exchange membranes of this invention is preferably between 2.5 wt % and 15 wt % of the polymer matrix.

Incorporation of Inorganic Fillers into the Membrane

The production of membranes containing inorganic filler is achieved by a variety of techniques.

There are two primary methods for synthesizing the oxide proton conductors described here. The most common route is base hydrolysis of soluble metal chlorides, metal nitrates or other metal salt solutions. Most transition-metal chlorides and nitrates are soluble in acid. When the solution pH is raised by the addition of base, the metal precipitates as hydroxide. Further processing, by either calcination or hydrothermal treatment, converts the hydroxide to the oxide.

The second route is the sol-gel route. In this process, a metal hydroxide gel is formed by slowly adding small amounts of water to a solution of metal alkyl or alkoxide in a hydrocarbon (or another unreactive organic) solvent. Water reacts to form alkanes (from alkyls) or alcohols (from alkoxides) and a dispersed metal hydroxide gel. This gel can be consolidated by aging or converted to an oxide by hydrothermal treatment or calcination.

Conventionally, water absorbing inorganic oxide materials is embedded into the pores of a porous polymer matrix by several processes. One method includes impregnating inorganic oxide particles as fine powders, either commercially available or synthesized chemically, by metal precipitation or sol-gel route mentioned above into the pores of a porous polymer matrix. Another method includes addition of direct precursor, generally in form of metal alkoxides, into the pores of a porous polymer matrix, and then converting the precursor material into the desired proton conducting oxide. Another method includes precipitating a mixture of the ion-conducting oxide and a polymer matrix from solution and pressing the precipitate into a membrane. The impregnation of inorganic materials also includes converting a soluble precursor to a proton conducting metal oxide in an aqueous solution containing an emulsion or suspension of a polymer and simultaneously precipitating the polymer and the metal oxide. In most of the cases, the solid polymer electrolyte, such as Nafion®, is soaked in the inorganic metal alkoxide precursor or alcoholic solution of one or more metal alkoxides of the formula $(RO)_4$ M, where R is an alkyl group of 1 to 4 carbon atoms, till the desired percentage of the impregnation of inorganic fillers impregnates the pores of Nafion®. Alkoxy groups may be linear groups, such as primary alkoxy groups, e.g. propoxy, or secondary alkoxy groups, such as isopropoxy and the four groups per molecule may be the same or may be different. The alcohol solvent in the metal alkoxide solution is an aliphatic alcohol of formula R'OH wherein R' is an alkyl group of 1 to 4 carbon atoms, for example, methanol, ethanol, propanol and butanol. After soaking the surface, the membrane is preferably rinsed to wash away surface metal alkoxide. The next step of the process is to hydrolyze the metal alkoxide in the membrane with water.

Filling the inorganic materials into the polymeric matrix by the above process may not be homogeneous. Some portions of the matrix may comprise more oxide than other portions of the matrix. In non-homogeneous fillings, it is possible that some portions of the matrix may comprise a little oxide or no oxide at all. It is also possible to find higher concentrations of the filler particles in the bottom part of the membrane due to the sedimentation effect of the heavier ceramic/inorganic particles. As a result, the solid fillers in composite membranes do not contribute sufficiently to proton conductivity of the membrane under dry conditions.

The present invention obviates the aforesaid disadvantages. An in-situ sol-gel process is attempted wherein a homogeneous, transparent and less viscous inorganic sol is first prepared by controlled hydrolysis and polymerization route followed by a simple water hydrolysis to metal alkoxide without any acidic or basic environment. Subsequently, the required amount of the sol is embedded to the polymer matrix. The less viscous sol enters the fine pores of perfluorosulfonic acid (PFSA) and due to the acidic nature of the latter forms Si—OH network in the pores, which on heating at 90° C. under vacuum culminate as Si—O—Si linkages forming a film of desired thickness. As a result, a transparent polymer film is obtained without any particle/phase separation. The transparent nature of the film is also maintained from surface of the membrane to the bulk and throughout the entire surface of the polymer matrix.

The present invention provides filler particles embedded in the membrane that absorb water under wet conditions and provide a reservoir of water to keep the membrane irrigated under dry conditions. Thus, the water absorbing particles allow the fuel cell to survive periods of "inlet-stream draught" without excessive loss in membrane conductivity. Preferably, the water absorbing particles are smaller than the membrane thickness such that reaction gases do not leak from the anode to cathode compartment and vice versa. An optimal membrane thickness for a typical application ranges between 60-100 microns.

With the present invention, humidification requirements of a single cell and fuel cell stack in an operating system will be reduced. This will result in reduction or elimination of humidification equipment and the reduction or elimination of condensing requirements in the downstream of the fuel cell stack. Accordingly, system complexity and cost are substantially reduced. Consequently, fuel cell stack response to periods of low-inlet-stream humidity will be improved and membrane durability will be increased.

Fuel cells with the composite membrane are tested for performance. Single cell (active area=25 cm$^2$) with fully-hydrated composite membrane electrolyte yields a maximum power density of 720 mW/cm$^2$ against pure Nafion-1135, which exhibits 550 mW/cm$^2$ under similar operational conditions. Similarly, when the fuel cell comprising this membrane is operated at 18% humidity, it yields a maximum power density of 300 mW/cm$^2$ at atmospheric pressure as against 30 mW/cm$^2$ with the fuel cell employing Nafion-1135 under identical operational conditions.

The fuel cell with the composite membrane of the present invention can operate above 100° C. with near-zero humidity yielding a maximum power density of 300 mW/cm$^2$, at atmospheric pressure.

The following examples are given by the way of illustration and therefore should not be construed to limit the scope of the invention.

Example 1

The effect of incorporation of silica to perfluorosulfonic acid by a simple water hydrolysis sol-gel route is investigated in terms of proton conductivity of the composite membrane and its performance evaluation in the fuel cell at elevated temperatures with varying relative humidity values under ambient atmospheric pressures.

The following five membranes and single cells are individually prepared and the thickness of all the membranes is adjusted at about 80 micron. Toray carbon paper of thickness 0.28 mm is used for the backing layer. To the backing layer, 1.5 mg/cm$^2$ of Vulcan XC72R carbon slurry is applied by brushing method. In-house prepared Vulcan XC72R carbon-supported 40 wt. % Pt catalyst is coated onto it by brushing method. The catalyst loading onto both the electrodes is 0.5 mg/cm$^2$. Membrane electrode assembly (MEA) is obtained by hot pressing the membrane sandwiched between the cathode and anode under 25 kN at 125° C. for 3 minutes. MEA thus prepared is loaded in the single cell and the performance is evaluated.

1. Cell A: The Nafion-silica composite membrane is prepared in accordance with the above method. The silica content in this membrane is adjusted to 2.5 wt % of perfluorosulfonic acid.

2. Cell B: The Nafion-silica composite membrane is prepared in accordance with the above method. The silica content in this membrane is adjusted to 5 wt % of perfluorosulfonic acid.

3. Cell C: The Nafion-silica composite membrane is prepared in accordance with the above method. The silica content in this membrane is adjusted to 10 wt % of perfluorosulfonic acid.

4. Cell D: The Nafion-silica composite membrane is prepared in accordance with the above method. The silica content in this membrane is adjusted to 15 wt % of perfluorosulfonic acid.

5. Cell E: The solid polymer electrolyte membrane Nafion®-1135 purchased from Du Pont is employed for comparison.

The operation conditions of the cells are as follows.
Reaction gases: hydrogen (anode), oxygen (cathode)
Cell operation temperature: 60° C.
Cell operation pressure: Atmospheric pressure The high humidification of the cell (assumed as 100% relative humidity) is maintained by passing hydrogen and oxygen gases to the anode and cathode sides, respectively, of the fuel cell through a humidification bottle containing deionized water. The humidification bottle temperature is maintained between 60° C. and 70° C. Hot, wet hydrogen and oxygen gases are passed to the anode and cathode sides, respectively, at a flow rate of 1.5 lit/min controlled by a mass-flow controller. The current densities and power densities for all the five cells are measured and the results are shown in FIG. 1.

It is apparent from the results shown in FIG. 1 that the resistance values of the cells comprising silica-embedded Nafion® composite membranes are lower as compared to the Nafion® membrane. The resistance is lowest for 10 wt % silica-Nafion® composite membrane. The maximum power density of 720 mW/cm$^2$ is achieved with 10 wt % silica embedded Nafion® composite membrane compared to 550 mW/cm$^2$ for Nafion®-1135. The maximum power density for the fuel cell with composite membrane having 15 wt % silica decreases due to the increased resistance of the membrane as shown in FIG. 1.

Example 2

During the investigation, all the five cells are intentionally dried by passing dry gases through the cells, to investigate the effect of incorporation of silica particles in Nafion® membrane. The performance of cells A, B, C, D and E at low relative-humidity (RH) conditions such as 18% RH, are investigated and compared. The RH value of 18% in the fuel cells is maintained through the Arbin instrument, USA. The other operating conditions of the cells are same as in example 1. The results of the performance evaluation of all the cells are shown in the FIG. 2.

Figure 2:
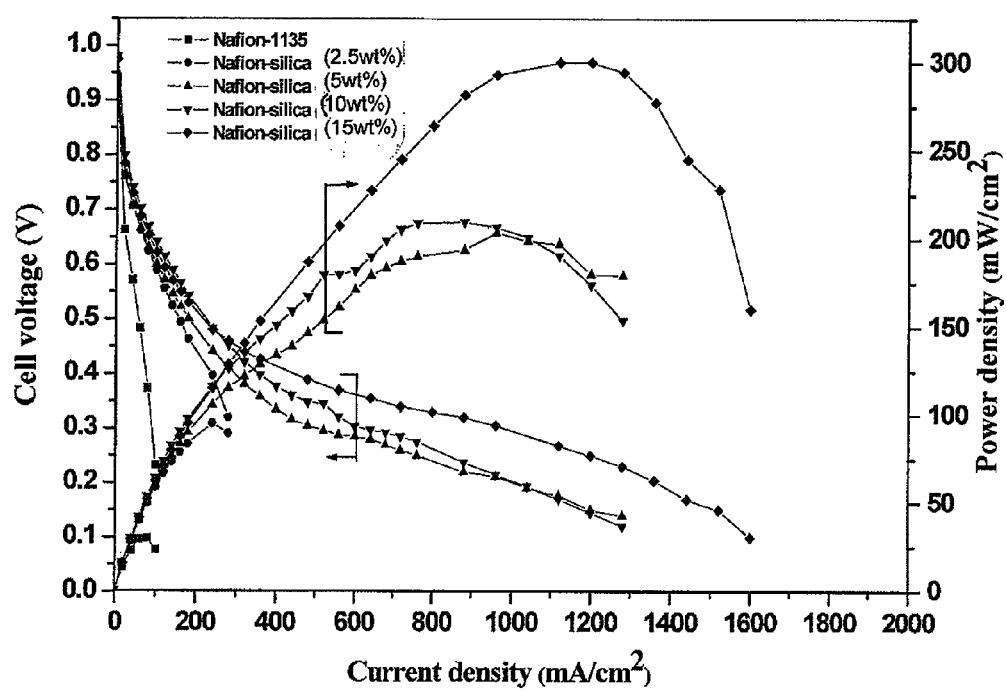
FIG. 2 shows performance curves for Nafion-1135 and Nafion-Silica composite membrane in fuel cell at 18% relative humidity at ambient atmospheric pressure in an embodiment of the present invention.

It can be seen from the results shown in FIG. 2 that the cells A, B, C and D possess excellent characteristics. The fuel cell comprising silica particles in Nafion® matrix shows more prompt rising of the power density curves with increasing content of silica in the polymer matrix compared to fuel cell E that has Nafion®-1135 as membrane electrolyte.

It is observed that at this relative humidity, the humidification of the hydrogen gas is insufficient for cell E, which results in its poor performance. The cell yields a maximum power density of 30 mW/cm$^2$ at a load current-density of 100 mA/cm$^2$ due to the poor conductivity of the Nafion® membrane. On the other hand, under identical conditions, the cells employing composite membranes exhibit a little effect on their performance. The performance is increased gradually as the wt % of silica content in Nafion® membrane increases. A maximum power density of 300 mW/cm$^2$ is achieved at a load current-density of 1200 mA/cm$^2$ for the cell employing a composite membrane of 15 wt % silica while operating at 60° C. under atmospheric pressure.

The above cell performance with composite membranes could be due to retention of water by the inorganic fillers such as silica in the pores of Nafion® membrane, which do not allow complete dehydration of the membrane. Hence, the proton conductivity of the membrane is maintained, although it is low compared to high humidity conditions. Therefore, the membrane can transport protons from anode to cathode yielding attractive power densities.

Example 3

Silicon oxide-Nafion® composite membrane exhibits lower resistance and higher current densities at elevated temperatures (>70° C.). Silicon oxide or hydroxide essentially lowers the vapor pressure of water in the membrane, i.e. the hydrated silicon oxide provides better water retention than bare Nafion®-membrane at elevated temperatures. Also, the impregnation of silicon oxide into the pores of the Nafion® makes silicon oxide-Nafion® membrane less susceptible to temperature damage. One reason for the decreased cell performance with both the modified and bare Nafion® membranes with increasing temperature is the reduction of partial pressure of the reactant gases. When the total cell pressure is maintained at 3 atmosphere and cells are heated from 80° C. to 120° C., the partial pressure of water increases from 0.5 to 2.5 atmosphere, decreasing the partial pressure of the reactant gases from 2.5 to 0.5 atmosphere. This drop in reactant gas partial pressure decreases the performance of the fuel cell.

Figure 3:
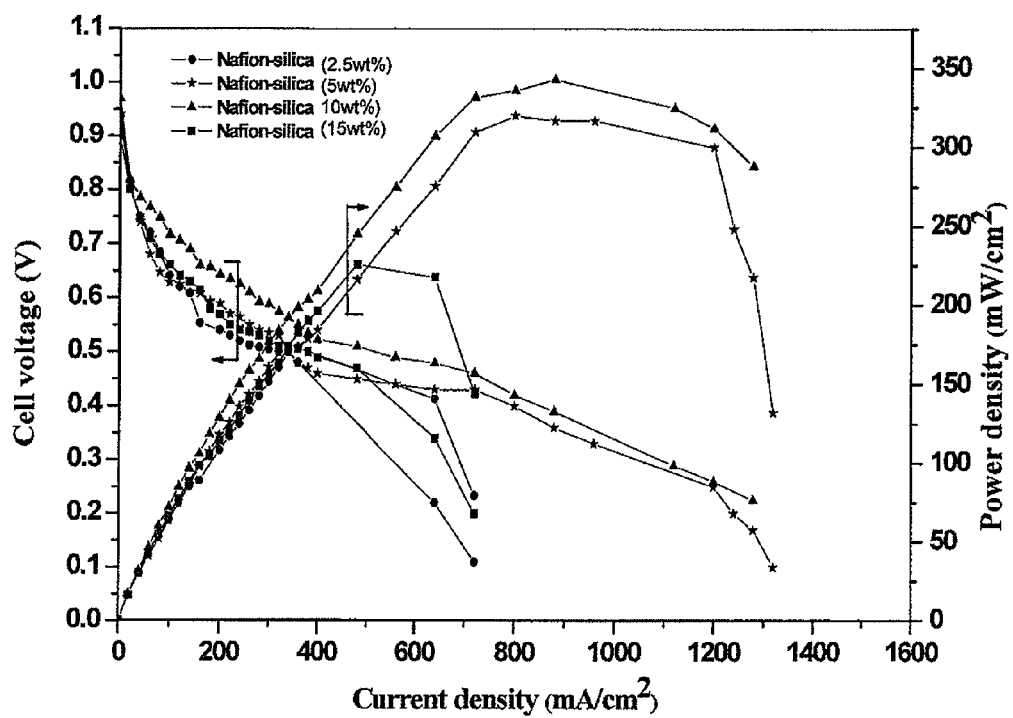
FIG. 3 shows performance curves for Nafion-1135 and Nafion-Silica composite membrane in fuel cell at 100° C. and at ambient atmospheric pressure in an embodiment of the present invention.

In our testing conditions, fuel cells are operated at ≈100° C. at atmospheric pressure without any backpressure on either side of the cell. At these cell temperatures, cells with Nafion®-1135 membrane fail to give any performance. However, cells with siliconoxide-Nafion® composite membranes, exhibit performance curves shown in the FIG. 3. A gradual increase in performance of the fuel cells is observed as the silica content in the composite membrane is increased. A maximum power density of 340 mW/cm$^2$ is achieved at silica content of 10 wt % of perfluorosulfonic acid. The cell with composite membrane having silica content 15 wt % of the perfluorosulfonic acid decreases in performance as shown in FIG. 3.

The invention claimed is:

1. A process for the preparation of sol-gel modified alternative NAFION-Silica composite membrane used in a polymer electrolyte fuel cell, said process comprising the steps of:
   (a) preparing silica sol using water hydrolysis and poly condensation reaction by mixing silicon alkoxide, isopropyl alcohol and water, under stirring, in a molar ratio of 1-1.2:3.9-4.1:3.9-4.1 respectively, followed by sonication for 10-15 minutes to obtain the visibly homogenous and transparent colloidal suspension,
   (b) impregnating the required amount of above said sol within the polymer matrix of perfluorosulphonic acid (NAFION) to obtain the resultant admixture, followed by sonication for another 15-20 minutes and transfer to a flat dish, followed by drying under vacuum, at a temperature in the range of 85°-95° C. and detaching the desired silica NAFION composite membrane.

2. The process of claim 1, wherein the silicon alkoxide used in step (a) is tetraethyl ortho silicate.

3. The process of claim 1, wherein the molar ratio of tetra ethyl ortho silicate to isopropyl alcohol and water used in step (a) is 1:4:4.

4. The process of claim 1, wherein the NAFION-Silica membrane obtained is homogenous and visibly transparent in nature.

5. The process of claim 1, wherein the silica content in the NAFION-Silica composite membrane obtained is in the range of 2.5-15 wt % of perfluorosulfonic acid (Nafion).

6. The process of claim 5, wherein the NAFION-Silica composite membrane obtained has a proton conductivity at a temperature of 150°-155° C. and at all values of relative humidity.

7. The process of claim 5, wherein the NAFION-Silica composite membrane obtained has a proton conductivity of 5.28×10$^{-3}$ S/cm at 150° C. and at near-zero humidity.

8. The process of claim 5, wherein the NAFION-Silica composite membrane obtained is used in a polymer electrolyte fuel cell, at a temperature in the range of 60°-150° C. at atmospheric pressure.

9. The process of claim 5, wherein the NAFION-Silica composite membrane obtained is used in a polymer electrolyte fuel cell at a relative humidity of 0-100% at atmospheric pressure.

10. The process of claim 1, wherein the silica content in the NAFION-Silica composite membrane obtained is 10 wt % of perfluorosulfonic acid (NAFION).

11. The process of claim 1, wherein the NAFION-Silica composite membrane is used in polymer electrolyte fuel cells.

12. The process of claim 1, wherein the NAFION-Silica composite membrane obtained has a proton conductivity at a temperature of 150°-155° C. and at all values of relative humidity.

13. The process of claim 1, wherein the NAFION-Silica composite membrane obtained has a proton conductivity of 5.28×10$^{-3}$ S/cm at 150° C. and at near-zero humidity.

14. The process of claim 1, wherein the NAFION-Silica composite membrane obtained is used in a polymer electrolyte fuel cell, at a temperature in the range of 60°-150° C. at atmospheric pressure.

15. The process of claim 1, wherein the NAFION-Silica composite membrane obtained is used in a polymer electrolyte fuel cell at a relative humidity of 0-100% at atmospheric pressure.

* * * * *